(12) United States Patent
Derby

(10) Patent No.: US 12,533,223 B1
(45) Date of Patent: Jan. 27, 2026

(54) APPARATUS AND METHOD FOR OPTIMIZED PROSTHESIS PACKAGING AND/OR DELIVERY

(71) Applicant: Brian M. Derby, Sarasota, FL (US)

(72) Inventor: Brian M. Derby, Sarasota, FL (US)

(*) Notice: Subject to any disclaimer, the term of this patent is extended or adjusted under 35 U.S.C. 154(b) by 0 days.

(21) Appl. No.: 18/584,619

(22) Filed: Feb. 22, 2024

(51) Int. Cl.
*A61F 2/02* (2006.01)

(52) U.S. Cl.
CPC ...................... *A61F 2/02* (2013.01)

(58) Field of Classification Search
CPC ............. A61F 2/12; A61F 2/52; A61F 2/0005
See application file for complete search history.

(56) References Cited

U.S. PATENT DOCUMENTS

| | | | |
|---|---|---|---|
| 10,004,534 B2* | 6/2018 | Anderson | A61B 17/3468 |
| 11,583,382 B2 | 2/2023 | Harvie | |
| 11,622,791 B2 | 4/2023 | Quiros et al. | |
| 2009/0204107 A1* | 8/2009 | Keller | A61F 2/12 606/1 |
| 2015/0297339 A1* | 10/2015 | Placik | C01C 1/04 623/8 |
| 2016/0278808 A1 | 9/2016 | Anderson | |
| 2018/0116779 A1 | 5/2018 | Marx | |
| 2019/0365527 A1 | 12/2019 | Wijay | |
| 2020/0100885 A1* | 4/2020 | Harvie | A61F 2/0059 |
| 2021/0338280 A1* | 11/2021 | Viquez | A61B 17/3468 |

FOREIGN PATENT DOCUMENTS

CN 207229598 U * 4/2018

* cited by examiner

*Primary Examiner* — Christopher D. Prone
(74) *Attorney, Agent, or Firm* — Anton J. Hopen; Trenam Law

(57) ABSTRACT

Described herein relates to an apparatus and method for optimized packaging and/or delivery of at least one prosthesis and/or prosthetic implant into at least one surgical pocket. A prosthesis delivery apparatus is provided, such that at least one prosthesis may be delivered with and/or introduced into a receiving end of the prosthesis delivery apparatus. In addition, the at least one prosthesis may be extruded into a surgical pocket, via an expandable opening of a terminal end of the prosthesis delivery apparatus. Additionally, the prosthesis delivery apparatus may comprise a flexible material, such that the sleeve may manipulate its size and/or shape to accommodate the size and/or shape of the at least one prosthesis. The prosthesis delivery apparatus may also be configured to retain its shape and/or size during the at least one prosthesis extrusion, in addition to subsequent the at least one prosthesis extrusion.

16 Claims, 11 Drawing Sheets

APPARATUS AND METHOD FOR OPTIMIZED PROSTHESIS PACKAGING AND/OR DELIVERY

BACKGROUND OF THE INVENTION

1. Field of the Invention

This invention relates, generally, to prosthetic implants. More specifically, it relates to an apparatus and method for optimized packaging and/or delivery of at least one prosthesis and/or prosthetic implant into at least one surgical pocket.

2. Brief Description of the Prior Art

Prosthetic implants (i.e., prosthesis) including, but not limited to, breast implants, pectoral implants, gluteal implants, and others have been used extensively for many years. Prosthetic implants can take many forms, many of which are comprised of a compressible or deformable material, such as silicone. In order to place such an implant within a body or a cavity of a patient, an incision is made to access the desired site of placement and develop the pocket or space between the tissue planes where the implant will reside.

It is desirable that the incision in the patient for the surgical pocket be as small as possible for a variety of reasons including reduced trauma to the patient, shorter recovery time, and lessened infection risk. The incision is therefore smaller than the implant itself. In order to insert the implant through the incision, a surgeon will manipulate the implant by hand to deform or compress it and guide it through the incision into the surgical pocket. Such direct handling of the implant has several shortcomings.

The time involved in manipulating the implant to guide it through the relatively small incision is greater than with a large incision. This additional surgical time increases the risks of infection and complications from anesthesia. The amount of time required also impacts the costs of the procedure because of the additional time of the physician and staff. In some instances, implant failures in the form of minor damage to the outer surface of the implant can also be caused by the manipulation.

As known in the art, traditional hand manipulation of an implant into a surgical pocket can take between 10 to 20 minutes per implant for even a highly skilled surgical practitioner. Typically, hand manipulation of an implant requires the use of a larger incision and would be done with a saline implant. The amount of time required has a direct bearing on the expense of the procedure, the surgical expense reflecting the surgeon's time, the support staff within the operating room, and the amount of time allocated for the surgical procedure. Accordingly, any improvements to reduce the time required for implantation of the silicone implant will have significant cost savings with respect to the surgical procedure.

In order to address these problems, currently devices known in the art have been developed to aid in sliding an implant through the incision. By placing the implant in the sleeve, a surgeon squeezes the sleeve to deform the implant and force it through the second end and into the surgical cavity. In order to accommodate different size implants, the second end of the sleeve is trimmed to create the desired size hole. However, once the sleeve has been trimmed to a desired size hole, it is no longer viable for additional use and must be discarded. As such, this process introduces substantial cost and waste, as each sleeve may only be implemented once and if a surgeon fails to cut the hole to the required size initially, then the surgeon must continue cutting and/or deforming additional sleeves, until the desired size hole has been obtained.

Moreover, during the surgical procedure, a substantial amount of lubricant is required to properly transfer the implant through the sleeve and into the surgical pocket. This process is implemented to substantially lower the coefficient of friction between the implant and the sleeve. However, if the lubricant is not evenly spread throughout both the sleeve and around the lubricant, then the increase in friction between the sleeve and the implant may cause substantial damage to the sleeve and/or the implant during the procedure and/or increase the overall time required for the surgery.

Accordingly, what is needed is an efficient, effective, and easy-to use an apparatus and method for optimized packaging and/or delivery of at least one prosthesis and/or prosthetic implant into a surgical pocket, such that the apparatus may be used a plurality of times during the same surgery and/or a plurality of surgeries, in addition to providing even dispersal of the lubricant within the apparatus and/or around the implant. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a collapsable prosthesis delivery apparatus for use in a surgical procedure. In an embodiment, the collapsable prosthesis delivery apparatus may comprise the following: (a) a terminal end and a receiving end, the collapsable prosthesis delivery apparatus being tapered such that a width of the terminal end may be smaller than a width of the receiving end; (b) a waist region having a top and a bottom, the waist region being disposed about at least one portion of the collapsable prosthesis delivery apparatus; (c) an expandable opening of the terminal end; (d) an interior surface that forms an internal cavity, the internal cavity being sized to receive at least one prosthesis; and (e) at least one channel circumferentially disposed about at least one portion of the internal cavity of the collapsable prosthesis delivery apparatus, the at least one channel being in fluidic communication with the internal cavity. In this embodiment, the collapsable prosthesis delivery apparatus may be manipulatable, such that subsequent to the at least one prosthesis being positioned within the internal cavity, a manually applicable directional pressure may cause the at least one prosthesis to extrude from the expandable opening of the terminal end.

In some embodiments, the at least one channel is configured to receive at least one lubricant, such that the at least one lubricant may be added to the internal cavity. Additionally, subsequent to the at least one prosthesis being disposed near the receiving end, the waist region inhibits the at least one prosthesis from translating toward the terminal end. In these other embodiments, the apparatus may further comprise a fluid lining disposed about at least one portion of the receiving end, such that the fluid lining may also be configured to retain a predetermined amount of at least one lubricant, such that a manually applicable pressure may cause the at least one lubricant to translate from the fluid lining through the at least one channel and/or be disposed about at least one portion of the internal cavity.

In some embodiments, the receiving end may also comprise a sealable opening, such that during nonuse the sealable opening may be closed, thereby preventing any portion of the at least one lubricant from escaping the fluid lining and/or the internal cavity. Moreover, the receiving end may comprise at least one temporary adhesive, the at least one temporary adhesive being configured to temporarily affix a circumference of the sealable opening together. In this manner, when a manually applicable directional pressure is applied to the receiving end, the temporary adhesive may then be configured to release the receiving end, allowing the at least one prosthesis to be inserted into the internal cavity. In some embodiments, the at least one lubricant may also be antibacterial.

In some embodiments, the terminal and the receiving end of the collapsable prosthesis delivery apparatus may be configured to telescopically collapse into the waist region, such that the receiving end may abut the top of the waist region and/or the terminal end may abut the bottom of the waist region. In addition, in some embodiments, when the manually applicable directional pressure is not applied, a circumference of the expandable opening may be temporarily affixed together.

Additionally, in some embodiments, the fluid lining comprising a fluid pocket, such that the fluid pocket may be configured to retain a predetermined amount of the at least one lubricant. In these other embodiments, the fluid pocket may be in fluidic communication with the at least one channel. Furthermore, subsequent to a manually applicable directional pressure being applied to the pocket, the fluid pocket may also be configured to release the predetermined amount of the at least one lubricant into the at least one channel.

Moreover, another aspect of the present disclosure pertains to a delivery system for inserting at least one prosthesis into a surgical pocket. In an embodiment, the delivery system may comprise the following: (a) the at least one prosthesis; (b) a collapsable prosthesis delivery apparatus, the collapsable prosthesis delivery apparatus comprising: (i) a terminal end and a receiving end, the collapsable prosthesis delivery apparatus being tapered such that a width of the terminal end may be smaller than a width of the receiving end; (ii) a waist region having a top and a bottom, the waist region being disposed about at least one portion of the collapsable prosthesis delivery apparatus; (iii) an expandable opening of the terminal end; (iv) an interior surface that forms an internal cavity, the internal cavity being sized to receive at least one prosthesis; and (v) at least one channel circumferentially disposed about at least one portion of the internal cavity of the collapsable prosthesis delivery apparatus, the at least one channel being in fluidic communication with the internal cavity. In this embodiment, the collapsible prosthesis delivery apparatus may be adapted to be manually manipulated to translate the at least one prosthesis along the internal cavity and through the expandable opening.

In some embodiments, the at least one channel may be configured to receive at least one lubricant, such that the at least one lubricant may be added to the internal cavity. In addition, subsequent to the prosthesis being disposed near the receiving end, the waist region may be configured to inhibit the at least one prosthesis from translating toward the terminal end.

In some embodiments, the system may further comprise a fluid lining disposed about at least one portion of the receiving end, such that the fluid lining may also be configured to retain a predetermined amount of at least one lubricant, such that a manually applicable pressure may cause the at least one lubricant to translate from the fluid lining through the at least one channel and/or be disposed about at least one portion of the internal cavity.

Moreover, in some embodiments, the receiving end may comprise a sealable opening, such that during nonuse the sealable opening may be closed, preventing any portion of the at least one lubricant from escaping the fluid lining and/or the internal cavity. In these other embodiments, the at least one lubricant may also be antibacterial.

Furthermore, an additional aspect of the present disclosure pertains to a method of inserting at least one prosthesis into a surgical pocket. In an embodiment, the method may comprise the following steps: (a) providing a collapsable prosthesis delivery apparatus, the collapsable prosthesis delivery apparatus comprising: (i) a terminal end and a receiving end, the collapsable prosthesis delivery apparatus being tapered such that a width of the terminal end may be smaller than a width of the receiving end; (ii) a waist region having a top and a bottom, the waist region being disposed about at least one portion of the collapsable prosthesis delivery apparatus; (iii) an expandable opening of the terminal end; an interior surface that forms an internal cavity, the internal cavity being sized to receive at least one prosthesis; and (v) at least one channel circumferentially disposed about at least one portion of the internal cavity of the collapsable prosthesis delivery apparatus, the at least one channel being in fluidic communication with the internal cavity; (b) disposing at least one lubricant, via the receiving end, into the at least one channel; (c) inserting the at least one prosthetic into the internal cavity of the collapsable prosthesis delivery apparatus; (d) introducing the collapsable prosthesis delivery apparatus into the surgical pocket; and (e) manipulating the collapsable prosthesis delivery apparatus to conform to a shape of the at least one prosthesis and apply pressure to translate the at least one prosthesis along the length of the internal cavity, out of the expandable opening, and/or into the surgical pocket.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
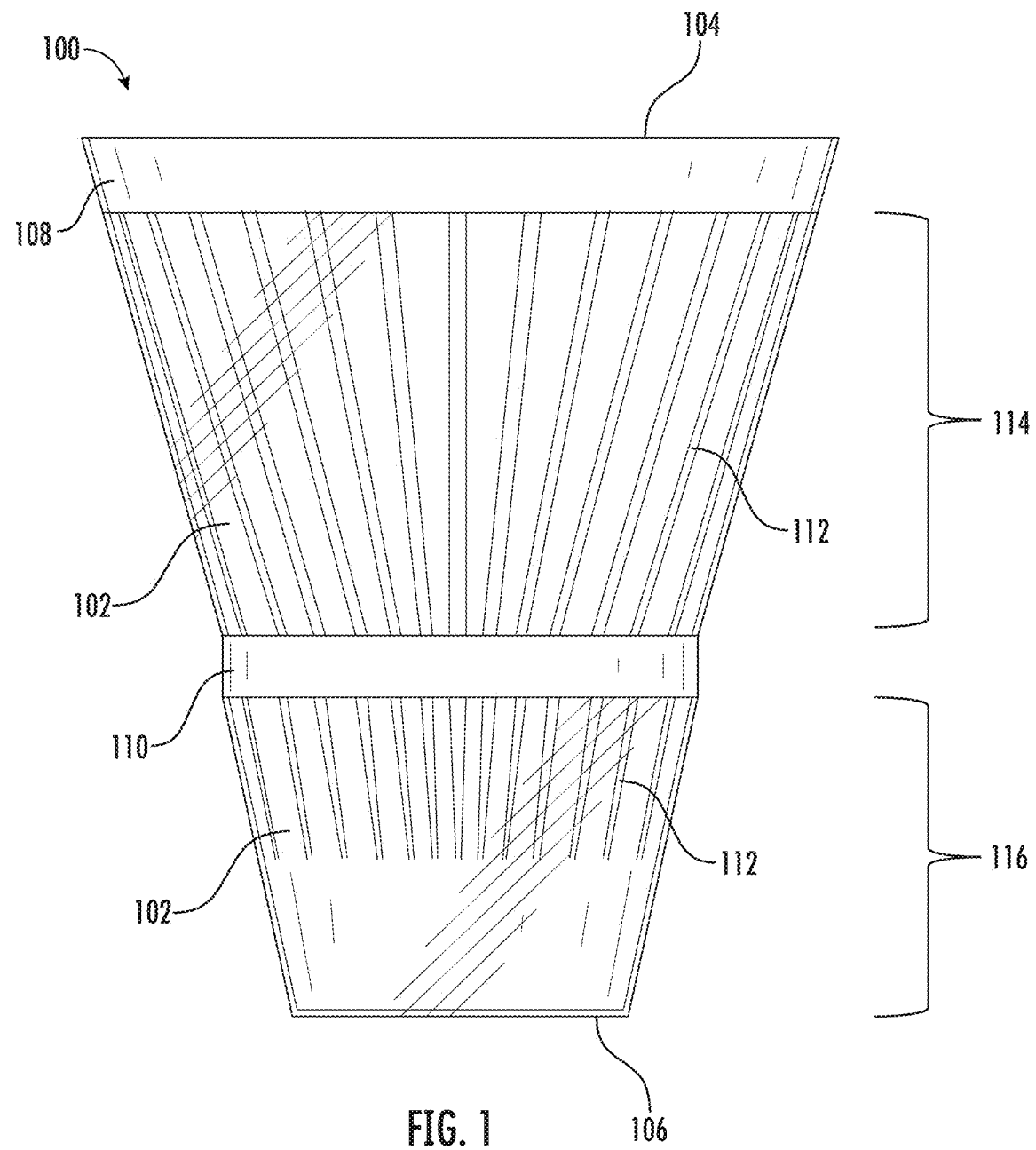
FIG. 1 is a graphical exemplification of a prosthesis delivery apparatus, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

As such, elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Therefore, a reference to first and/or second elements does not mean that only two elements may be employed there or that the first element must precede the second element in some manner. Also, unless stated otherwise a set of elements may comprise one or more elements Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Accordingly, the relevant descriptions of such features apply equally to the features and related components among all the drawings. For example, any suitable combination of the features, and variations of the same embodiment, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

As used herein, the term "mechanical communication" refers to any coupling mechanism configured to transmit and/or transfer any force known in the art using any methods and/or device known in the art. Non-limiting examples of mechanical communication may include mechanical coupling, clamps, gear drives, gear shafts, drive shaft, universal joint, sleeve coupling, roller chain coupling, flange coupling, Oldham coupling, Split Muff coupling, and/or flange coupling. For ease of reference, the exemplary embodiment described herein refers to mechanical coupling, but this description should not be interpreted as exclusionary of other mechanical coupling mechanisms.

As used herein, the term "fluidic communication" refers to any coupling mechanism known in the art configured to transmit and/or transfer any fluid known in the art using any methods and/or device known in the art. Non-limiting examples of fluidic communication may include fluidic coupling, via tubing, a tubing nipple, a tubing barb, a plumbing connector, a plumbing fitting, a fluid clamp, a valve, a pinch valve, a pressure valve, and/or a pressure coupling. For ease of reference, the exemplary embodiment described herein refers to fluidic coupling in tubing, via tubing nipples, tubing barbs, and/or valves, but this description should not be interpreted as exclusionary of other fluidic coupling mechanisms.

As used herein, the term "coupling mechanism" refers to any apparatus known in the art configured to temporarily affix one object to at least one alternative object. Non-limiting examples of the coupling mechanism may include a screw, a nail, a rivet, a magnet, an adhesive, a zipper, a pinch, a magnet, a pressure valve, and/or a pressure coupling. For ease of reference, the exemplary embodiment described herein refers to a zipper and/or an adhesive, but this description should not be interpreted as exclusionary of other coupling mechanisms.

As used herein, the term "prosthesis" refers to any artificial device known in the art configured to replace and/or augment a part of a human body and/or animal body (e.g., dog). Non-limiting examples of the prosthesis may include silicone implants, saline implants, gummy bear implants, round implants, teardrop implants, smooth implants, textured implants, and/or fat grafting. For ease of reference, the exemplary embodiment described herein refers to silicone implants, but this description should not be interpreted as exclusionary of other implants and/or artificial devices.

As used herein, the term "lubricant" refers to any substance known in the art configured to reduce friction between surfaces in mutual contact, which ultimately reduces the heat generated when the surfaces move, during medical and/or surgical procedures. Non-limiting examples of the lubricant may include deionized water, fatty acid esters, lipoaspirate, adipates, palmitates, sebacates, stearates, disinfectant solution, anti-bacterial solution, silicone, and/or saline-solution. For ease of reference, the exemplary embodiment described herein refers to fatty acid esters, anti-bacterial solution, and/or saline-solution, but this description should not be interpreted as exclusionary of other lubricants.

As used herein, the term "medical surface" refers to any sterilized surface known in the art found within an operating room and/or a surgery room of a hospital. Non-limiting examples of the medical surface may include a surgical table, an operating table, a medical instrument table, and/or a Mayo tray. For ease of reference, the exemplary embodiment described herein refers to the medical instrument table, but this description should not be interpreted as exclusionary of other sterilized surfaces within the operating room and/or the surgery room of a hospital.

As used herein, the terms "about," "approximately," or "roughly" refer to being within an acceptable error range (i.e., tolerance) for the particular value as determined by one of ordinary skill in the art, which will depend in part on how the value is measured or determined (e.g., the limitations of a measurement system), (e.g., the degree of precision required for a particular purpose, such as packaging and/or delivery of at least one prosthesis and/or prosthetic implant into a surgical pocket). As used herein, "about," "approximately," or "roughly" refer to within ±25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Prosthesis Delivery Apparatus

The present disclosure pertains to an apparatus and method for optimized packaging and/or delivery of at least one prosthesis and/or prosthetic implant (hereinafter "at least one prosthesis") into at least one surgical pocket (hereinafter "the surgical pocket"). In an embodiment, the apparatus (hereinafter "prosthesis delivery apparatus") may comprise a collapsable sleeve having a receiving end and/or a terminal end. As such, the prosthesis delivery apparatus may be configured to be compacted, such that at least one portion of the receiving end may abut at least one portion of the terminal end (i.e., folded, telescopic, etc.). The receiving end may be configured to receive at least one prothesis (e.g., silicone implant). In this embodiment, the terminal end of the collapsable sleeve may also be disposed opposite the receiving end. As such, subsequent to receiving a manually applicable pressure, the terminal end may be configured to temporarily open, such that the at least one prosthesis may be extruded from the collapsable sleeve (i.e., the prosthesis delivery apparatus).

As such, FIG. 1 depicts a graphical exemplification of a prosthesis delivery apparatus 100, according to an embodiment of the present disclosure. In this embodiment, prosthesis delivery apparatus 100 (i.e., the collapsable sleeve) may comprise a receiving end 104 and a terminal end 106. In this manner, as shown in FIG. 1, in conjunction with FIG. 9, prosthesis delivery apparatus 100 may be tapered, such that receiving end 104 may comprise a width that is larger than a width of terminal end 106. In addition, as shown in FIG. 1, in an embodiment, prosthesis delivery apparatus 100 may comprise a waist region 110, such that prothesis delivery apparatus 100 may be divided into two regions, a proximal region 114 and a terminal region 116. In this manner, waist region 110 may comprise a top end and a bottom end.

Moreover, in an embodiment, prosthesis delivery apparatus 100 may comprise a material (e.g., silicone) which may be sufficiently flexible, compressible, and/or deformable and/or which may enable prosthesis delivery apparatus 100 to assume a flattened configuration, a folded configuration, and/or a telescopic configuration (i.e., a compacted position) for storage and/or shipping. For example, as shown in FIG. 1, in some embodiments, prosthesis delivery apparatus 100 may comprise a conical shape. As such, when prosthesis delivery apparatus 100 is stored and/or shipped, receiving end 104 may be telescopically collapsed, such that at least one portion of receiving end 104 may abut the top end of waist region 110 and/or at least one portion of terminal end 106 may abut the bottom end of waist region 110.

Figure 2:
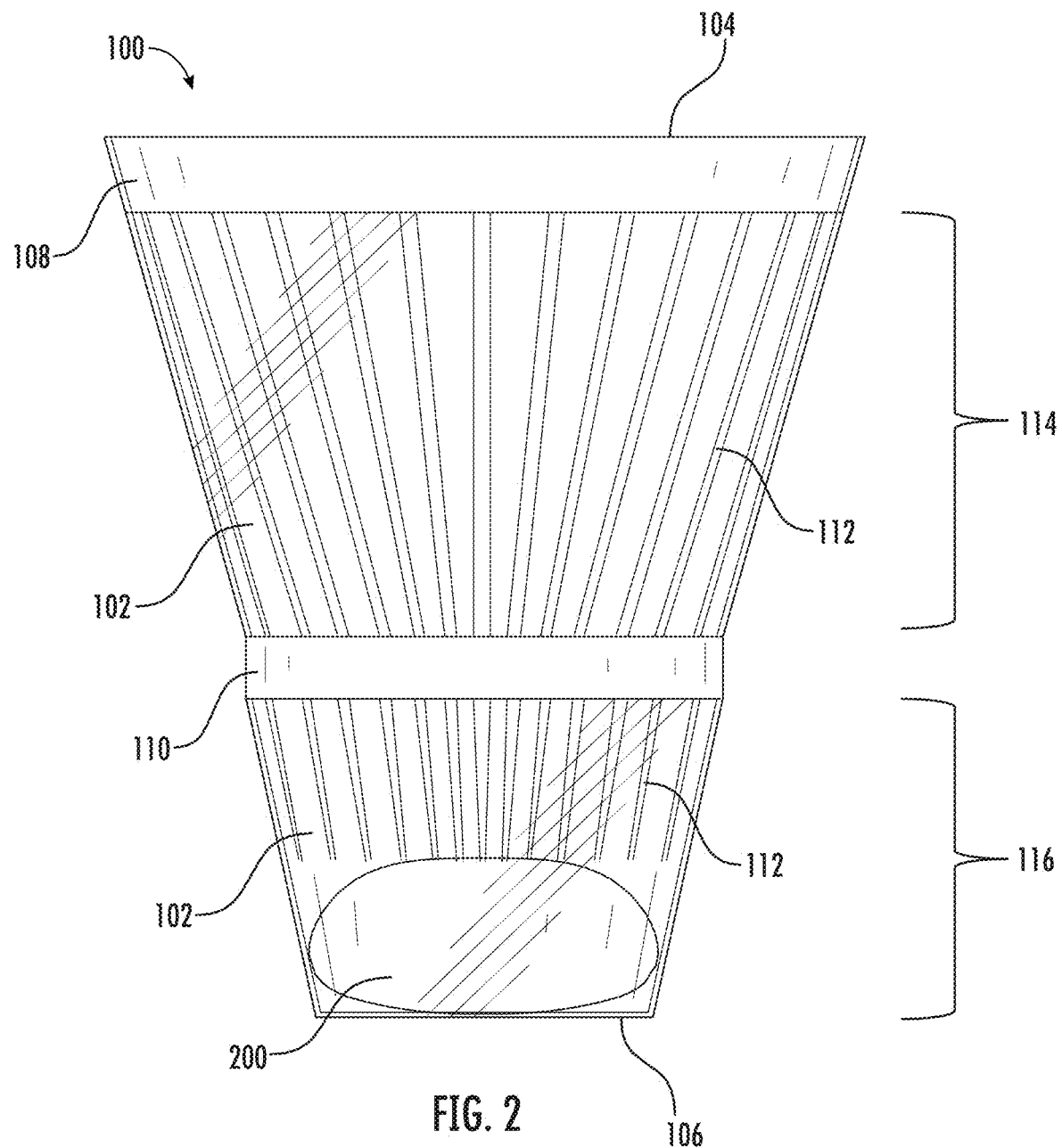
FIG. 2 is a graphical exemplification of a prosthesis delivery apparatus having at least one prosthesis disposed therewithin, according to an embodiment of the present disclosure.

In addition, as shown in FIG. 1, in conjunction with FIG. 2, in an embodiment, prosthesis delivery apparatus 100 may comprise an internal cavity. In this manner, the internal cavity may be in mechanical communication with receiving end 104 and/or terminal end 106. As such, receiving end 104 and/or terminal end 106 may comprise at least one opening, the at least one opening of receiving end 104 and/or terminal end 106 being expandable, allowing the translation of at least one prosthesis 200 therethrough. In this embodiment, subsequent to at least one prosthesis 200 being translated through the at least one opening, the at least one prosthesis 200 may be disposed within the internal cavity of prosthesis delivery apparatus 100.

As such, as shown in FIG. 2, in conjunction with FIG. 1, in an embodiment, the at least one prosthesis 200 may be configured to be disposed within the internal cavity of prosthesis delivery apparatus 100, via the at least one opening of receiving end 104. In this embodiment, the at least one prosthesis 200 may be temporarily positioned and/or retained within proximal region 114, such that a friction coefficient between an interior surface of the internal cavity of prothesis delivery apparatus 100 at waist region 110 may be greater than an acceleration due to gravity (i.e., 9.81 m/s$^2$). Additionally, in this embodiment, prosthesis delivery apparatus 100 may comprise a fluid liner 108 disposed about at least one portion of a circumference of receiving end 104. In this manner, fluid liner 108 may be configured to retain a predetermined amount (e.g., at least 5 mL to at most 50 mL) of at least one lubricant (e.g., deionized water, lipoaspirate, disinfectant solution, antibacterial solution, silicone spray, and/or saline-solution) (hereinafter "the lubricant").

Moreover, in an embodiment, prosthesis delivery apparatus 100 may comprise a plurality of channels 112 disposed about at least one portion of the circumference of the internal cavity. In this embodiment, the plurality of channels may be in mechanical and/or fluidic communication with fluid liner 108, such that the predetermined amount of the lubricant may be translated through at least one of the plurality of channels 112, evenly coating at least one portion of the internal cavity.

In addition, when being shipped and/or transported, in an embodiment, the internal cavity of the prosthesis delivery apparatus 100 may be pre-coated with the predetermined amount of the lubricant. For example, in some embodiments, subsequent to the predetermined amount (e.g., at least 5 mL to at most 50 mL) of the lubricant coating the at least one portion of the internal cavity, the coefficient of friction between the at least one prosthesis and the interior surface of the internal cavity may be less than the acceleration due to gravity. In this manner, as shown in FIG. 2, in these other embodiments, when the at least one prosthesis 200 is ready for insertion within a surgical pocket, the at least one prosthesis 200 may be translated through waist region 110 of the internal cavity into the terminal region 116, via any manually applicable directional pressure known in the art.

As shown in FIG. 2, in an embodiment, the at least one prosthesis 200 may be initially disposed within prosthesis delivery apparatus 100 during the manufacturing and/or pre-packaging process. In this manner, a circumference of the at least one opening of receiving end 104 and/or terminal end 106 may be temporarily affixed, such that the internal cavity of prosthesis delivery apparatus 100 may be sealed. In this manner, the internal cavity may be water-tight. For example, in some embodiments, the perimeter of the at least one opening of receiving end 104 and/or terminal end 106 may be heat sealed. In this manner, in these other embodiments, subsequent to receiving a manually applicable direction pressure, the seal of the at least one opening of receiving end 104 and/or terminal end 106 may be ruptured without structural damage and/or visual evidence of manipulation, such that the at least one prosthesis 200 may be translated through receiving end 104 and/or terminal end 106.

Moreover, in some embodiments, the at least one opening of receiving end 104 may be resealable, via any coupling mechanism known in the art (e.g., a zipper-lock). In this manner, during nonuse of prosthesis delivery apparatus 100, the circumference of the at least one opening of receiving end 104 may be sealed via the coupling mechanism, such that it is water-tight. As such, in these other embodiments, any residual lubricant remaining within the internal cavity, fluid liner 108, and/or the plurality of channels 112 may be retained within prosthesis delivery apparatus 100.

Figure 5:
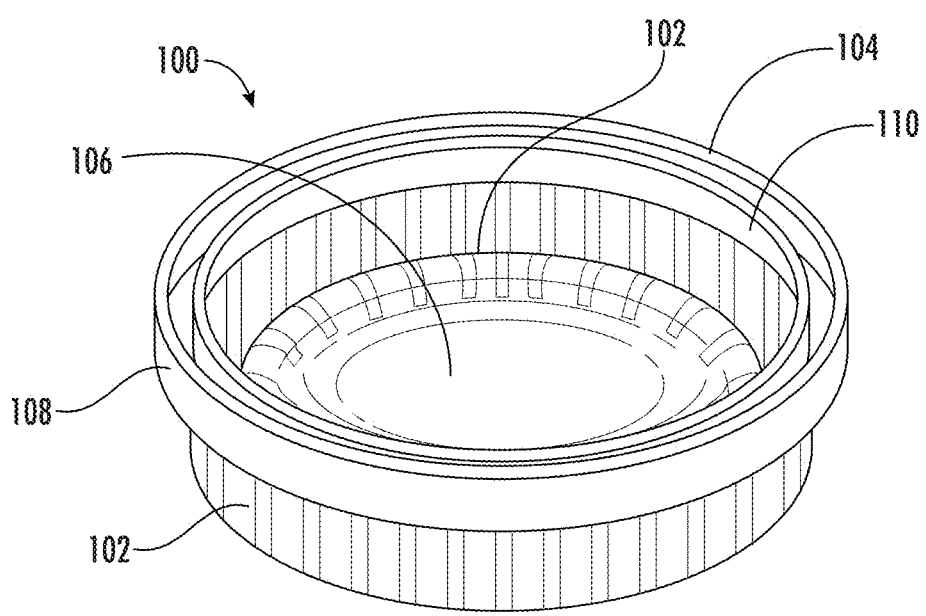
FIG. 5 is a graphical exemplification of a prosthesis delivery apparatus in a storage position, according to an embodiment of the present disclosure.

Furthermore, in an embodiment, as shown in FIG. 2, in conjunction with FIG. 5, the prosthesis delivery apparatus 100 comprising the at least one prosthesis 200 disposed within the internal cavity may be folded, collapsed (e.g., telescopic), crumpled, and/or any other compacting position known in the art. In this manner, as shown in FIG. 2, in conjunction with FIG. 5, delivery apparatus 100 may fit within a shipping container without continued manual effort and/or compression under another object in order to retain the compacted position. Additionally, any compaction of prosthesis delivery apparatus 100 and/or the at least one prosthesis 200 may be accomplished without damage to prosthesis delivery apparatus 100 and/or the at least one prosthesis 200.

In this manner, as shown in FIG. 2, in conjunction with FIG. 1 and FIG. 5, in an embodiment, prosthesis delivery apparatus 100 and/or the at least one prosthesis 200 may comprise no structural damage and/or visual evidence of manipulation into the compacted position when transitioning between the compacted position and the delivery position (i.e., full extension of prosthesis delivery apparatus 100, such that at least one prosthesis may be disposed within the internal cavity and/or translated into the surgical pocket, via prosthesis delivery apparatus 100).

Moreover, in some embodiments, when translating from the compacted position to the delivery position, the pre-coating of the predetermined amount of the lubricant (e.g., at least 5 mL to at most 50 mL) within the internal cavity of prosthesis delivery apparatus 100 may translate through at least one of the plurality of channels 112, such that the predetermined amount of the lubricant may be evenly distributed through the internal cavity.

Figure 3:
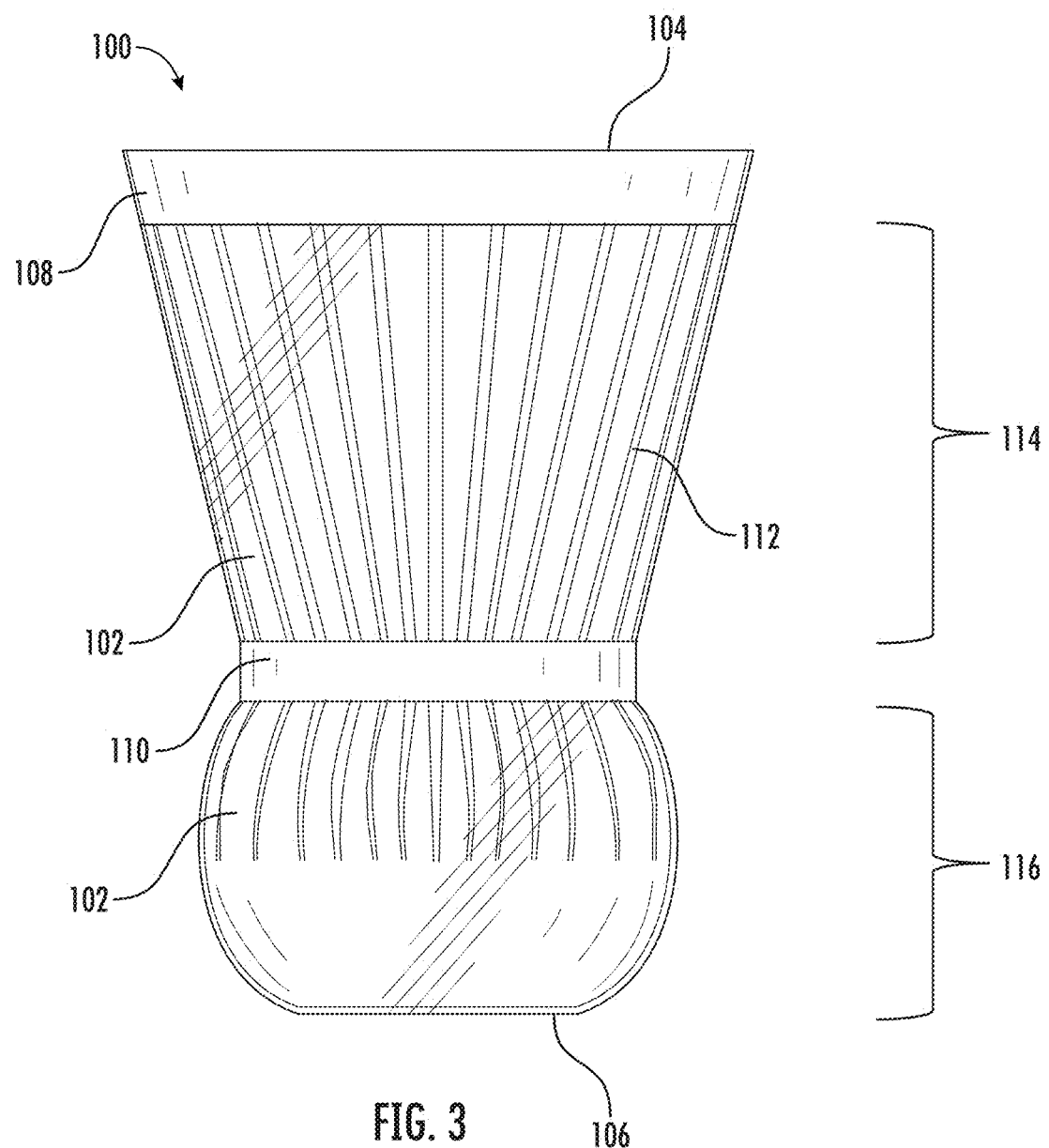
FIG. 3 is a graphical exemplification of a prosthesis delivery apparatus under a directional pressure, according to an embodiment of the present disclosure.

FIG. 3 depicts a graphical exemplification of prosthesis delivery apparatus 100 under a directional pressure, according to an embodiment of the present disclosure. In this embodiment, as disclosed above, prosthesis delivery apparatus 100 may comprise a flexible material known in the art. Non-limiting examples of the flexible material may include silicone, vinyl, and/or polyvinyl chloride. For ease of reference, the exemplary embodiment described herein refers to silicone, but this description should not be interpreted as limiting to alternative flexible materials.

Additionally, in an embodiment, the flexible material of prosthesis delivery apparatus 100 may be heat-stable, such that prosthesis delivery apparatus 100 may be repeatedly sterilized using pressure (e.g., autoclave), chemical (e.g., formaldehyde) vapor, dry heat (e.g., at least 320° F. for a predetermined period of time (e.g., at least 2 hours)), and/or any other sterilization method known in the art. For ease of reference, the exemplary embodiment described herein refers to pressure sterilization (e.g., autoclave), but this description should not be interpreted as exclusionary of other sterilization methods.

As shown in FIG. 5, in conjunction with FIGS. 1-2, as stated above, in an embodiment, the flexible material may be folded, collapsed (e.g., telescopic), crumpled, and/or any other compacting position known in the art without continued manual effort and/or compression under another object in order to retain the compacted position. As such, prosthesis delivery apparatus 100 may be stored within a storage container (e.g., a drawer, a shelf, and/or an autoclave) without loss of flexibility. In this manner, prosthesis delivery apparatus 100 may transition a plurality of times from the compacted position to the delivery position and/or re-used to deliver the at least one prosthesis 200 into a surgical pocket a plurality of times (e.g., at least 1000 surgical implementations) without damage and/or visual evidence of manipulation.

Another aspect of the present disclosure is that prosthesis delivery apparatus 100 may be configured to receive the manually applicable directional pressure about at least one portion of an outer service of the prosthesis delivery apparatus 100. As shown in FIG. 3, in conjunction with FIG. 2, in this embodiment, the flexible material of prosthesis delivery apparatus 100 may be configured to be adjusted and/or manipulated to facilitate the size of the at least one prosthesis 200. In this manner, when the at least one prosthesis 200 (e.g., silicone implant) is disposed within terminal end 106, subsequent to receiving a manually applicable directional pressure, terminal end 106 may adjust and/or manipulate a shape, such that a diameter of the at least one opening of terminal end 106 may be expandable, such that the at least one opening of terminal end 106 may accommodate a plurality of sizes (e.g., at least 100 cc to at most 3000 cc) of the at least one prosthesis 200. As such, the amount of manually applicable direction pressure required to adjust the shape and/or size of terminal end 106 to accommodate the shape and/or size of the at least one prosthesis 200 may be constant (i.e., the manually applicable directional pressure required to adjust the shape and/or size of terminal end 106 for a 100 cc prosthesis 200 is the same as the manually applicable directional pressure required to adjust the shape and/or size of terminal end 106 for a 3000 cc prosthesis 200). In this embodiment, subsequent to the manipulation of the shape and/or size of terminal end 106, the flexible material of prosthesis delivery apparatus 100 may be configured to re-conform and/or retain the initial delivery position, such that terminal end 106 may resize and/or reshape to the original size and/or shape of the initial delivery position.

Figure 4:
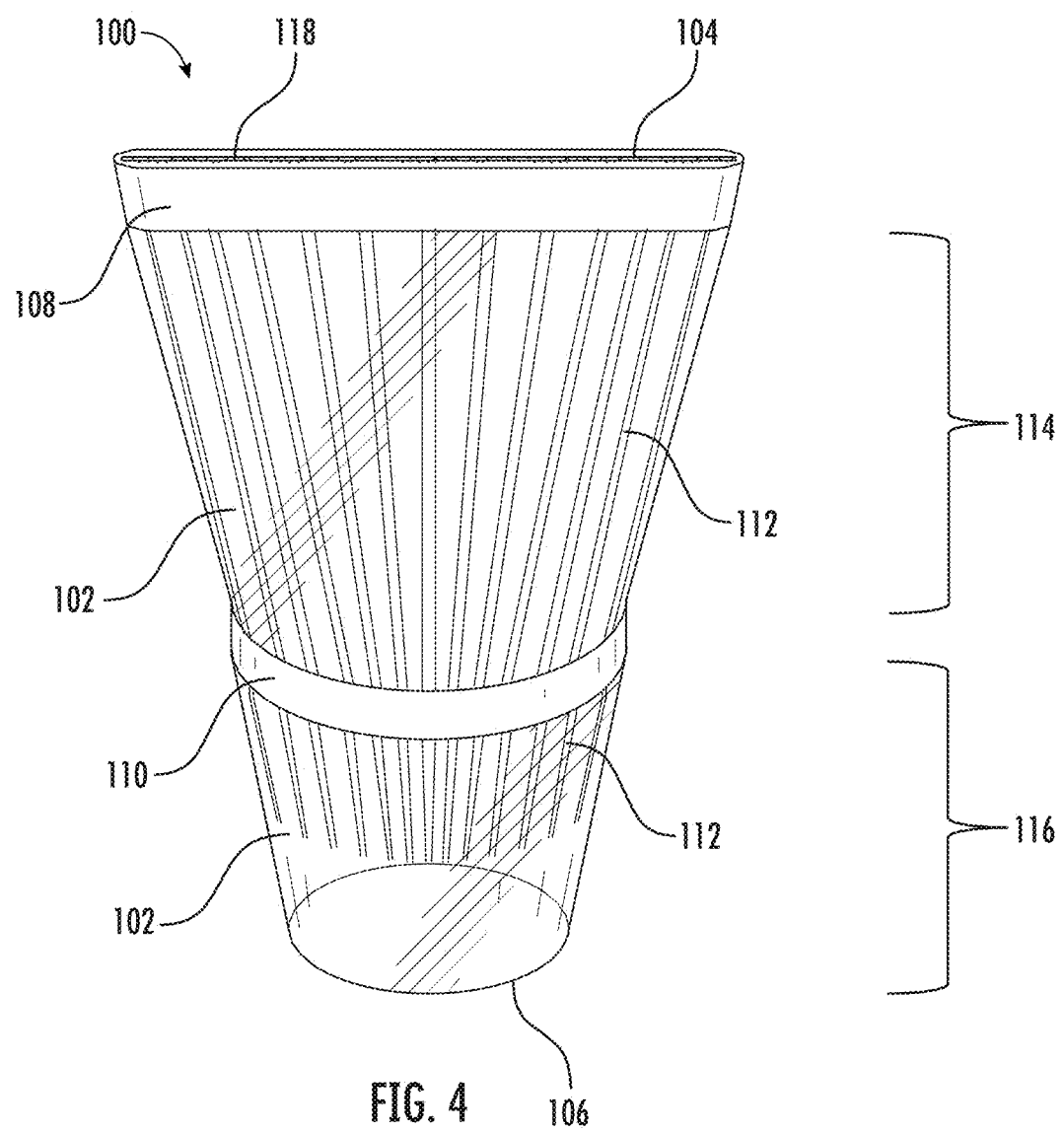
FIG. 4 is a graphical exemplification of a front perspective view of a prosthesis delivery apparatus, according to an embodiment of the present disclosure.

Additionally, as shown in FIG. 4, in an embodiment, fluid lining 108 of receiving end 104 may comprise a fluid pocket 118. In this embodiment, fluid pocket 118 may comprise at least one resealable fluid pocket opening configured to receive the predetermined amount (e.g., at least 5 mL to at most 50 mL) of the lubricant. As such, in this embodiment, the at least one rescalable fluid pocket opening of fluid pocket 118 may comprise any coupling mechanism known in the art (e.g., an adhesive). Moreover, as shown in FIG. 4, in conjunction with FIGS. 6A-8B, fluid pocket 118 may be in mechanical and/or fluidic communication with at least one of the plurality of channels 112, via at least one channel opening 120. The at least one channel opening 120 may also comprise at least one valve, such that the at least one channel opening 120 may be temporarily sealed, such that the predetermined amount of the lubricant may be retained within fluid pocket 118.

Furthermore, in an embodiment, subsequent to a manually applicable direction pressure being applied to fluid pocket 118, the at least one valve may be configured to be open, such that fluid pocket 118 and at least one of the plurality of channels 112 may be in fluidic communication. In this manner, the predetermined amount of the lubricant may be translated from fluid pocket 118 into the internal cavity of prosthesis delivery apparatus 100, via at least one of the plurality of channels 112, such that the lubricant may be evenly disposed about an interior surface of the internal cavity.

As shown in FIGS. 6A-8B, in conjunction with FIG. 1 and FIG. 4, in an embodiment, the predetermined amount of the lubricant (e.g., at least 5 mL to at most 50 mL) may be disposed about fluid lining 108 without being disposed within fluid pocket 118. As such, in this embodiment, the predetermined amount of the lubricant may be disposed about an interior surface of fluid lining 108 via the at least one opening of receiving end 104. Accordingly, subsequent to being disposed about the interior surface of fluid lining 108, the predetermined amount of the lubricant may directly translate through at least one of the plurality of channels 112. In this manner, the interior surface of the internal cavity of prosthesis delivery apparatus 100 may comprise a plurality of ridges 122 configured to abut at least one portion of the interior surface of fluid lining 108, fluid pocket 118, and/or at least one of the plurality of channels 118. In this embodiment, the plurality of ridges 122 are configured to funnel the predetermined amount of the lubricant into at least one of the plurality of channels 112, such that the lubricant may evenly coat the interior surface of the internal cavity.

Additionally, in an embodiment, the plurality of channels 112 may be manipulatable. In this manner, at least one portion of the plurality of channels 112 (e.g., a perimeter of the plurality of channels 112) may be constricted and/or expanded based on the manually applicable directional pressure applied to prosthesis delivery apparatus 100. As such, subsequent to receiving the manually applicable directional pressure, the predetermined amount of the lubricant may be extruded from at least one portion of the plurality of channels 112, such that the predetermined amount of the lubricant may evenly coat each part of the interior surface of the internal cavity.

In some embodiments, the plurality of channels 112 may comprise at least one nodule (not shown) disposed about a predetermined location of an interior surface of the plurality of channels 112. In this manner, as the predetermined amount of the lubricant is translated through the plurality of channel 112, an amount of the predetermined amount of the lubricant may translate over the at least one nodule, such that the predetermined amount of lubricant may crest over and/or extrude from at least one of the plurality of channels 112, coating the interior surface of the internal cavity. In this embodiment, the predetermined amount of the lubricant may evenly coat the interior surface of the internal cavity regardless of the manually applicable direction pressure.

Figure 6A:
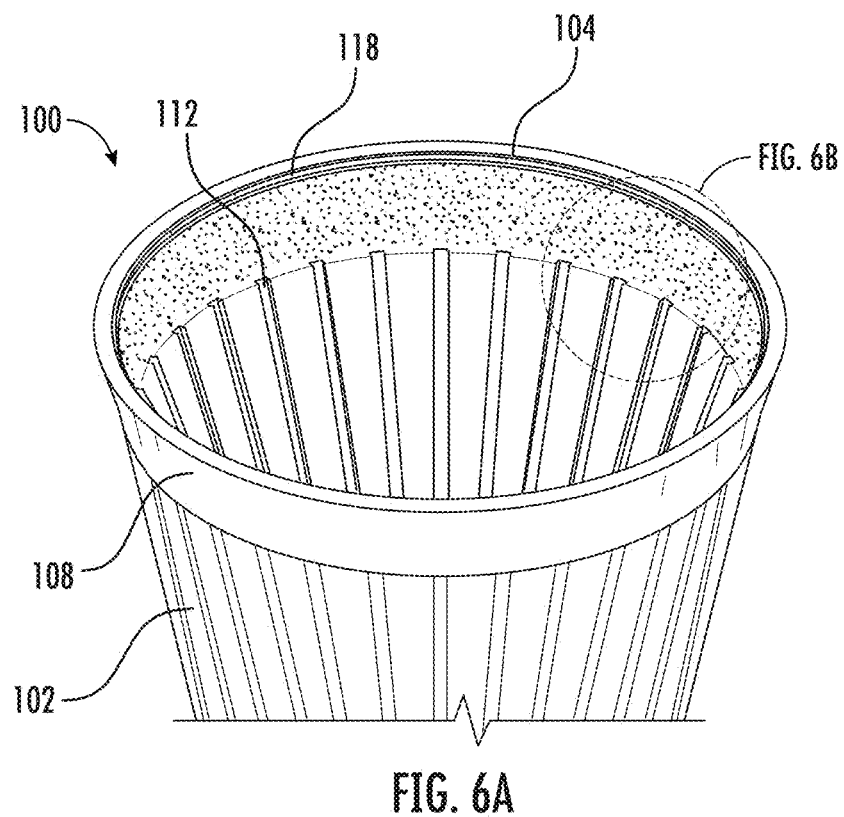
FIG. 6A is a graphical exemplification of a top perspective view of a prosthesis delivery apparatus, according to an embodiment of the present disclosure.
Figure 6B:
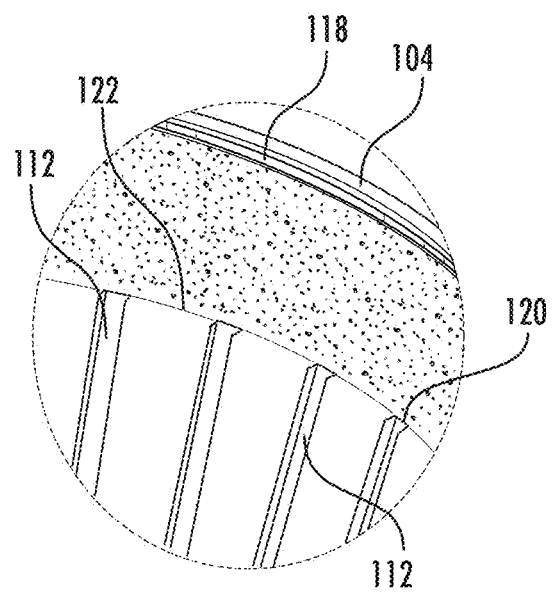
FIG. 6B is a graphical exemplification of an interior of the prosthesis delivery apparatus of FIG. 6A, according to an embodiment of the present disclosure.
Figure 7A:
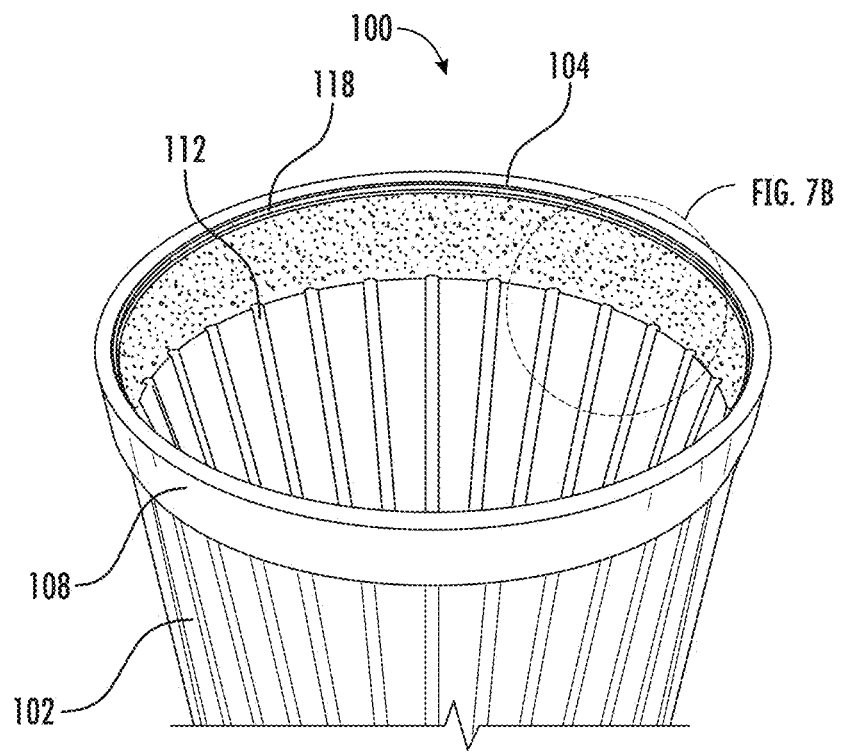
FIG. 7A is a graphical exemplification of a top perspective view of a prosthesis delivery apparatus, according to an embodiment of the present disclosure.
Figure 7B:
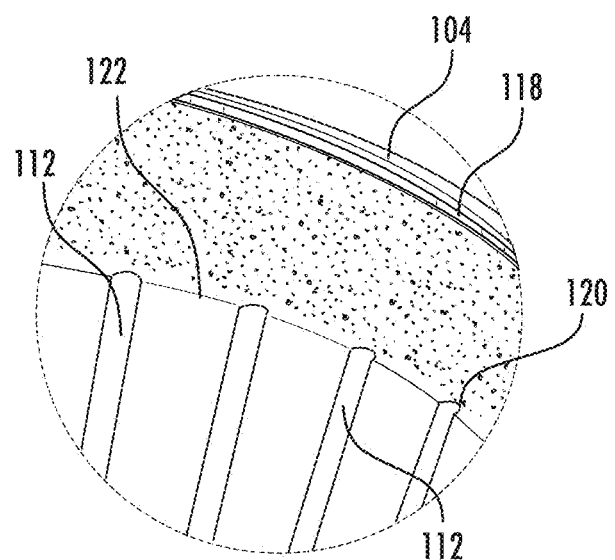
FIG. 7B is a graphical exemplification of an interior of the prosthesis delivery apparatus of FIG. 7A, according to an embodiment of the present disclosure.
Figure 8A:
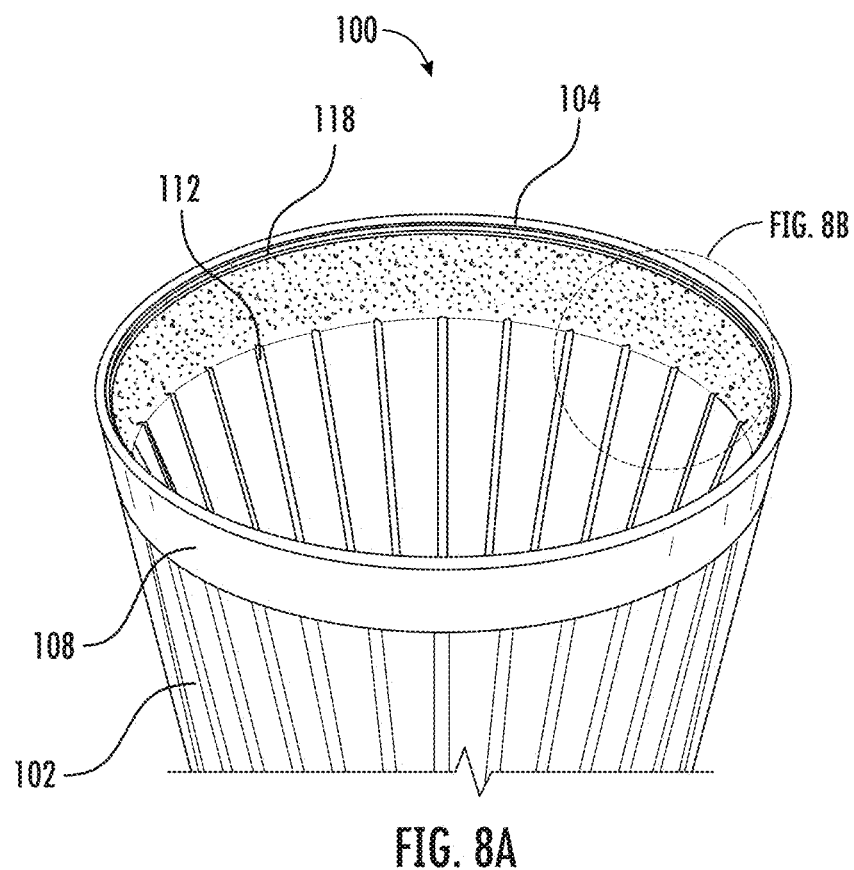
FIG. 8A is a graphical exemplification of a top perspective view of a prosthesis delivery apparatus, according to an embodiment of the present disclosure.
Figure 8B:
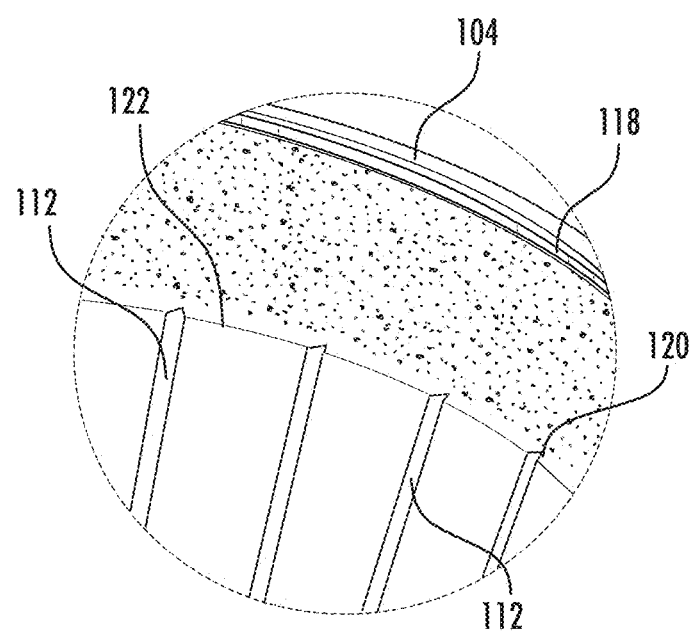
FIG. 8B is a graphical exemplification of an interior of the prosthesis delivery apparatus of FIG. 8A, according to an embodiment of the present disclosure.

The plurality of channels 112 may also comprise a plurality of shapes. For example, as shown in FIG. 6A-6B, the plurality of channels 112 may comprise a rectangular shape. In this manner, as shown in FIG. 7A-7B, the plurality of channels 112 may comprise a rounded shape and/or, as shown in FIG. 8A-8B, the plurality of channels may comprise a square, triangular, and/or pointed shape. Accordingly, in an embodiment, the plurality of channels 112 may comprise any shape known in the art configured to translate the predetermined amount of the lubricant through the internal cavity of prosthesis delivery apparatus 100. For case of reference, the exemplary embodiment described herein refers to the rounded, square, triangular, and/or pointed shape, but this description should not be interpreted as exclusionary of other shapes.

Figure 9:
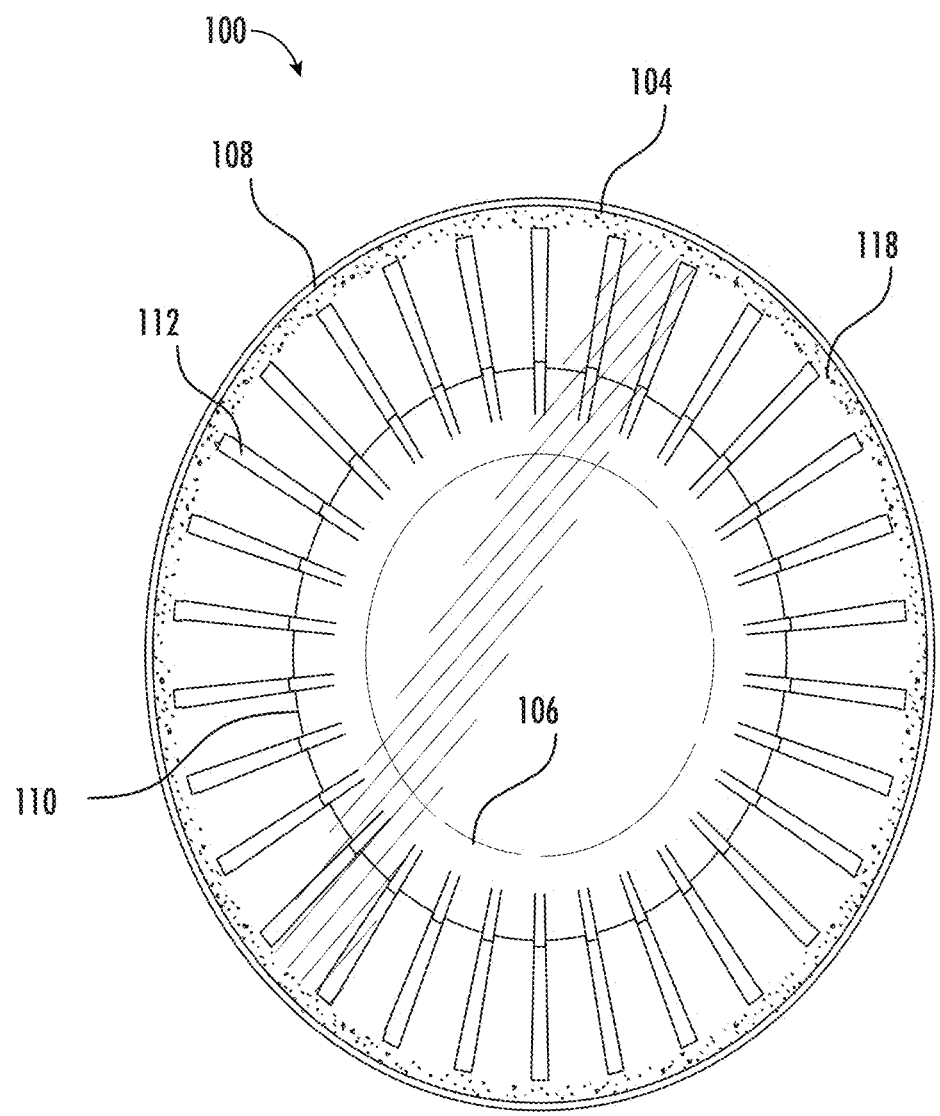
FIG. 9 is graphical exemplification of a planar view of a prosthesis delivery apparatus, according to an embodiment of the present disclosure.
Figure 10:
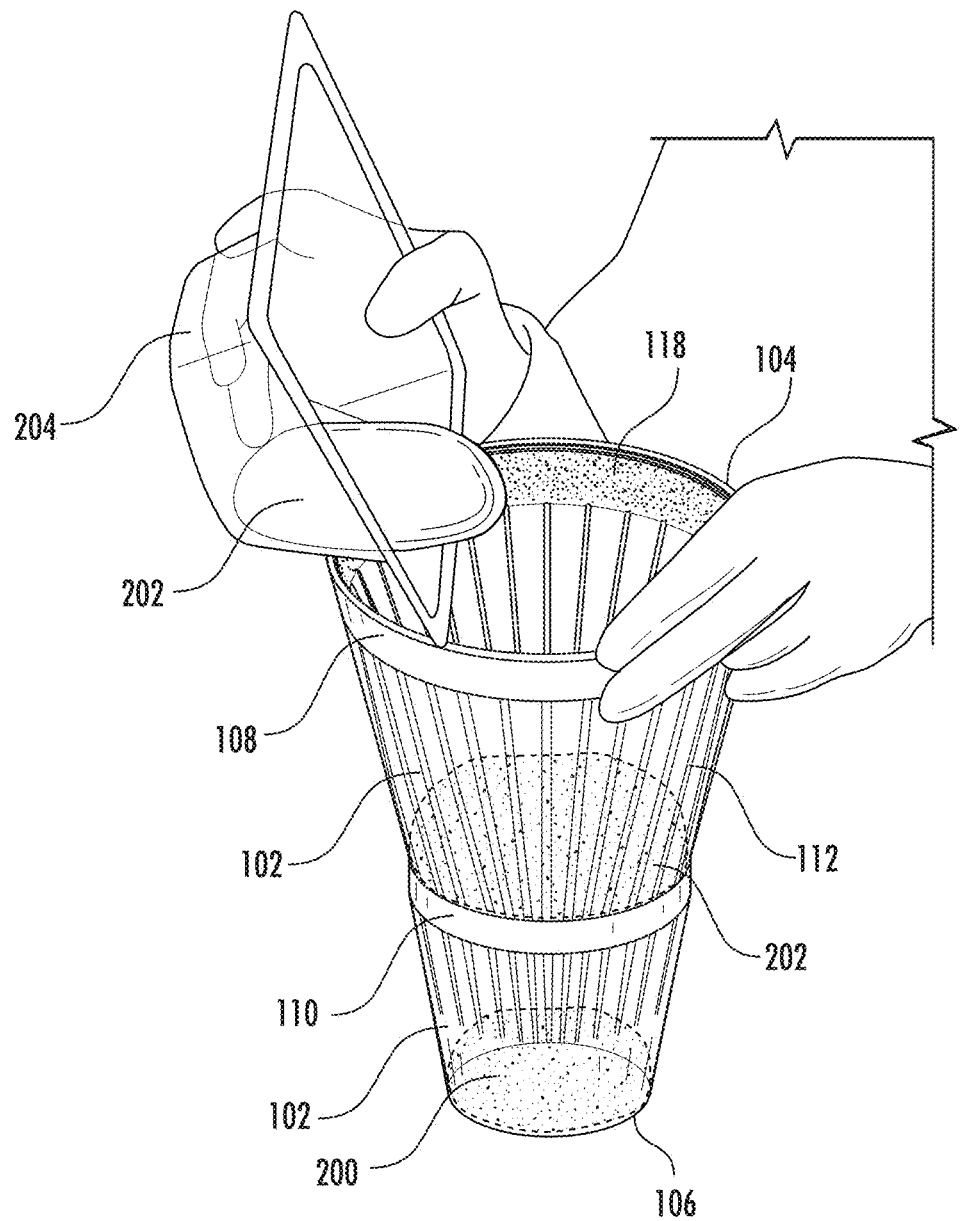
FIG. 10 is a graphical exemplification of at least one prosthesis being disposed within a prosthesis delivery apparatus, according to an embodiment of the present disclosure.

As shown in FIG. 9 and FIG. 10, in conjunction with FIG. 1 and FIG. 2, in an embodiment, as disclosed above, prosthesis delivery apparatus 100 may be tapered, such that the width of receiving end 104 may be larger than the width of terminal end 106. In this manner, waist region 110 may also be outwardly tapered, such that the bottom end of waist region 110 may comprise a width that is larger than the width of the top end of waist region 110. As such, in this embodiment, as shown in FIG. 10, when the at least one prosthesis 200 is disposed within the internal cavity of prothesis delivery apparatus 100, via the at least one aperture of receiving end 104, the at least one prosthesis may be retained within proximal region 114. In this manner, when the at least one prosthesis is disposed within proximal region 114 of the internal cavity, the predetermined amount (e.g., at least 5 mL to at most 50 mL) of the lubricant may be disposed evenly about at least one portion of an outer surface of the at least one prosthesis 200, in addition to the interior surface of the internal cavity.

Moreover, as shown in FIG. 9 and FIG. 10, in conjunction with FIG. 1 and FIG. 2, waist region 110 is configured to retain the at least one prosthesis within the proximal region 114 until a manually applicable directional pressure is applied to the outer surface of the prosthesis delivery apparatus 100. As such, a diameter of waist region 110 may be expandable. In this manner, subsequent to receiving a manually applicable direction pressure, waist region 110 may adjust and/or manipulate a shape, such that a diameter of waist region 110 may accommodate a plurality of sizes (e.g., at least 100 cc to at most 3000 cc) of the at least one prosthesis 200, such that the at least one prosthesis may then translate from proximal region 114 into terminal region 116.

In an embodiment, the at least one prosthesis may be configured to be temporarily retained within terminal region 116 until delivery into the surgical pocket is required. Accordingly, the amount of manually applicable direction pressure required to adjust the shape and/or size of wait region 110 to accommodate the shape and/or size of the at least one prosthesis 200 may also be constant (i.e., the manually applicable directional pressure required to adjust the shape and/or size of waist region 110 for a 100 cc prosthesis 200 is the same as the manually applicable directional pressure required to adjust the shape and/or size of waist region 110 for a 3000 cc prosthesis 200). In this manner, subsequent to the manipulation of the shape and/or size of waist region 110, the flexible material of prosthesis delivery apparatus 100 may be configured to re-conform and/or retain the initial delivery position, such that waist region 110 may resize and/or reshape to the original size and/or shape of the initial delivery position.

Another aspect of the present disclosure is that prosthesis delivery apparatus 100 may be free-standing. As such, as shown in FIG. 10, in conjunction with FIGS. 1-9, in an embodiment, the flexible material of prosthesis delivery apparatus 100 may comprise any amount rigidity known in the art configured to allow prosthesis delivery apparatus 100 to freely-stand in an upright position upon a medical surface (e.g., a surgical table, an operating table, a medical instrument table, and/or a Mayo tray), via terminal end 106 and/or receiving end 104. As such, when disposed within a free-standing, upright position, the flexible material of prosthesis delivery apparatus 100 may substantially retain the delivery position and/or compacted position of prosthesis delivery apparatus 100 without a continually applied pressure and/or support.

Furthermore, as shown in FIG. 10, in conjunction with FIGS. 1-9, in an embodiment, the at least one prosthesis 200 and/or at least one additional prosthesis 202 (i.e., pre-packaged 204) may be initially disposed within the internal cavity of prosthesis delivery apparatus 100, via receiving end 104. As such, the at least one prothesis 200 and/or the at least one additional prosthesis 202 may be initially shipped and/or stored separate from prosthesis delivery apparatus 100 (e.g., pre-packaging 204 of the at least one prosthesis 200 and/or the at least one additional prosthesis 202 comprising a predetermined size (e.g., 800 cc)).

As shown in FIG. 10, in conjunction with FIGS. 1-9, the internal cavity of proximal delivery apparatus 100 may also be configured to retain both the at least one prosthesis 200 and the at least one additional prosthesis 202, simultaneously. As such, the at least one additional prosthesis 202 may be disposed within proximal region 114, via receiving end 104, while the at least one prosthesis 200 may be disposed within terminal region 116. Accordingly, in this embodiment, while at least one prosthesis 200 may be translated through terminal end 106 into the surgical pocket, via the manually applied directional pressure, prosthesis delivery apparatus 100 may be configured to retain the at least one additional prosthesis 202 within proximal region 114, at the same time. In this manner, the manually applied directional pressure imparted on terminal end 106 and/or terminal region 116 may not alter and/or damage the size and/or shape of waist region 110, proximal region 114, and/or receiving end 104. In addition, the manually applied directional pressure imparted on terminal end 106 and/or terminal region 116 may not cause the translation of the at least one additional prosthesis 202 from proximal region 114. In this same manner, the manually applied directional pressure imparted on receiving end 104 and/or proximal region 114 may not alter and/or damage the size and/or shape of waist region 110, terminal end 106, and/or terminal region 116. As such, the manually applied directional pressure imparted on receiving end 104 and/or proximal region 114 may not cause the translation of the at least one prosthesis 200 from terminal region 116. In this embodiment, the manually applied directional pressure imparted on waist region 110 may not alter and/or damage the size and/or shape of receiving end 104, proximal region 114, terminal end 106, and/or terminal region 116.

Moreover, as shown in FIG. 10, in conjunction with FIGS. 1-9, in an embodiment, the at least one prosthesis 200 and/or the at least one additional prosthesis 202 may be initially retained within proximal region 114 and/or terminal region 116, such that the at least one prosthesis 200 may be directly translated into the surgical pocket from the internal cavity of prosthesis delivery apparatus 100, without requiring initial disposing of the at least one prosthesis 200 within the internal cavity, via receiving end 104. In this manner, subsequent to the translation of at least one prosthesis 200 into the surgical pocket, the at least one additional prosthesis 202 may then be translated into terminal region 116 and/or the surgical pocket and/or an alternative surgical pocket, via the manually applied directional pressure to proximal region 114 and/or terminal region 116. Accordingly, as disclosed above, subsequent to receiving a manually applicable direction pressure, the seal of the at least one opening of receiving end 104 and/or terminal end 106 may be ruptured without structural damage and/or visual evidence of manipulation, such that the at least one prosthesis 200 may be translated through receiving end 104 and/or terminal end 106.

Additionally, during manufacturing (i.e., pre-packaging) in some embodiments, the predetermined amount (e.g., at least 5 mL to at most 50 mL) of the lubricant may be initially disposed within the internal cavity of prosthesis delivery apparatus 100 (i.e., within the pre-packaging) and/or the predetermined amount of the lubricant may be disposed and/or integrated within the fluid pocket 118 of fluid liner 108.

Method of Use

Figure 11:
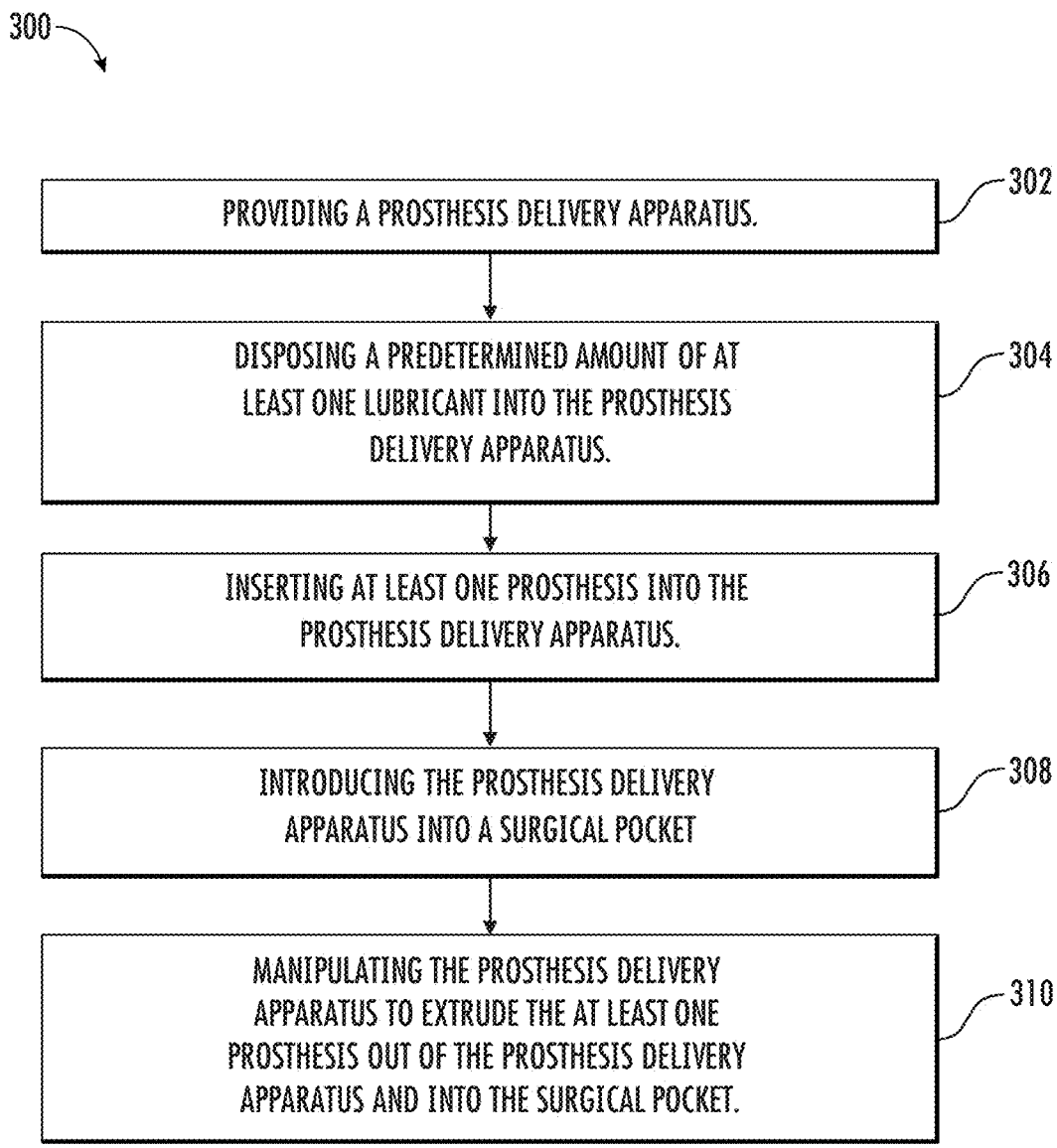
FIG. 11 is a flow chart depicting the steps of a method of delivering at least one prosthesis into a surgical pocket, via a prosthesis delivery apparatus, according to an embodiment of the present disclosure.

Referring now to FIG. 11, in conjunction with FIGS. 1-10, a method 300 is depicted for delivering at least one prosthesis 200 into a surgical pocket using prosthesis delivery apparatus 100. The steps delineated are merely exemplary of a preferred order for the delivery of the at least one prosthesis 200 using prosthesis delivery apparatus 100. The steps may be carried out in another order, with or without additional steps including therein. Additionally, the steps may be carried out with alternative embodiments of the prosthesis delivery apparatus 100, as contemplated in the above description.

As shown in FIG. 11, in conjunction with FIGS. 1-10, in an embodiment, method 300 for delivering at least one prosthesis 200 into a surgical pocket using prosthesis delivery apparatus begins with step 302, providing prosthesis delivery apparatus (e.g., collapsable sleeve) 100. The next step, step 304, may comprise disposing a predetermined amount the lubricant into an internal cavity of prosthesis delivery apparatus 100, via the at least one opening of receiving end 104. In this manner, in this embodiment, the predetermined amount of the lubricant may be configured to translate through the internal cavity of prosthesis deliver apparatus, via at least one of the plurality of channels 112.

Referring again to FIG. 11, in conjunction with FIGS. 1-10, next, method 300 may proceed to step 306. At step 306, at least one prosthesis 200 may be inserted into the internal cavity of prosthesis delivery apparatus 100, via the at least one opening of receiving end 104. In addition, in some embodiments, the predetermined amount of the lubricant may be added after the at least one prosthesis 200 is inserted within the internal cavity of prosthesis delivery apparatus 100. In this same manner, in some embodiments, an additional amount of the lubricant may also be added after the at least one prosthesis 200 is inserted within the internal cavity of prosthesis deliver apparatus.

Referring again to FIG. 11, in conjunction with FIGS. 1-10, method 300 may continue to step 308. At step 308, subsequent to disposing the at least one prosthesis 200 within the internal cavity of prosthesis delivery apparatus 100, at least one portion of terminal end 106 of prosthesis delivery apparatus 100 may be introduced into a surgical pocket. Finally, in this embodiment, method 300 may proceed to step 310. At step 310, prosthesis delivery apparatus 100 may be manipulated, via the manually applicable directional pressure, such that the at least one opening of terminal end 106 may expand, conforming to the dimensions of the at least one prothesis 200. Accordingly, in this embodiment, subsequent to receiving the manually applicable directional pressure, the at least one prosthesis 200 may be configured to translate from the proximal region 114 to the terminal region 116, such that the at least one prosthesis 200 may be extruded from the at least one expandable opening of terminal end 106 and into the surgical pocket.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Marx, Ann P. "STERILE IMPLANT DELIVERY SYSTEM." U.S. Patent Application Publication No. 2018/0116779. United States Patent and Trademark Office. May 3, 2018.

Wiljay, Bandula. "REUSABLE DELIVERY APPARATUS FOR DELIVERING A FELIXBLE PROSTHESIS TO A SURGICAL POCKET." U.S. Patent Application Publication No. 2019/0365527. United States Patent and Trademark Office. Dec. 5, 2019.

Harvie, Fraser. "PACKAGING AND DELIVERY DEVICE FOR A BREAST IMPLANT." U.S. Pat. No. 11,583,382. United States Patent and Trademark Office. Feb. 21, 2023.

Anderson, Robert G. "ASYMMETRICAL DUAL PROXIMAL END INSERTION BELLOW." U.S. Patent Application Publication No. 2016/0278808. United States Patent and Trademark Office. Sep. 29, 2016.

Chacón Quirós, Juan José, et al. "APPARATUS FOR THE IMPLANTATION OF MEDICAL DEVICES AND METHODS OF USE THEREOF." U.S. Pat. No. 11,622,791. United States Patent and Trademark Office. Apr. 11, 2023.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A collapsible prosthesis delivery apparatus for use in a surgical procedure, the collapsible prosthesis delivery apparatus comprising:
    a terminal end and a receiving end, the collapsible prosthesis delivery apparatus having an initial delivery position, whereby the collapsible prosthesis is tapered such that a width of the terminal end is smaller than a width of the receiving end;
    a waist region having a top and a bottom, the waist region being positioned between the terminal end and the receiving end of the collapsible prosthesis delivery apparatus, wherein the waist region defines a transition between a proximal region and a terminal region;
    an expandable opening of the terminal end, wherein the expandable opening is configured to temporarily affix together when not in use and expand upon manually applicable pressure to facilitate extrusion of the prosthesis;
    an interior surface that forms an internal cavity, the internal cavity being sized to receive at least one prosthesis;

at least one channel circumferentially disposed about at least one portion of the internal cavity of the collapsible prosthesis delivery apparatus, the at least one channel being in fluidic communication with the internal cavity;

wherein the receiving end comprises a sealable opening, wherein the sealable opening includes at least one temporary adhesive configured to temporarily affix a circumference of the sealable opening together, and wherein the at least one temporary adhesive is configured to release the receiving end upon application of a manually applicable directional pressure;

wherein the collapsible prosthesis delivery apparatus is free-standing when the terminal end is disposed on a medical surface, whereby the collapsible prosthesis delivery apparatus remains stable for manual manipulation during a surgical procedure;

wherein the collapsible prosthesis delivery apparatus is manipulatable, whereby subsequent to the at least one prosthesis being positioned within the internal cavity, a manually applicable directional pressure causes the at least one prosthesis to extrude from the expandable opening of the terminal end; and wherein subsequent to the at least one prosthesis being extruded from the expandable opening, the collapsible prosthesis delivery apparatus returns to the initial delivery position.

2. The apparatus of claim 1, wherein the at least one channel further comprises a plurality of predefined ridges, the plurality of predefined ridges abutting at least one portion of the interior surface, whereby subsequent to receiving the at least one lubricant, the plurality of ridges funnel the at least one lubricant into the at least one channel, such that the interior surface of the internal cavity is evenly coated with the at least one lubricant.

3. The apparatus of claim 2, wherein subsequent to the at least one prosthesis being disposed near the receiving end, the waist region inhibits the at least one prosthesis from translating toward the terminal end.

4. The apparatus of claim 3, further comprising a fluid lining disposed about a portion of the receiving end, wherein the fluid lining is configured to retain a predetermined amount of at least one lubricant, whereby a manually applicable pressure causes the at least one lubricant to translate from the fluid lining through the at least one channel and be disposed about at least one portion of the internal cavity.

5. The apparatus of claim 4, wherein the sealable opening of the receiving end, when not in use, is closed to prevent lubricant from escaping the fluid lining or the internal cavity.

6. The apparatus of claim 4, wherein the at least one lubricant is antibacterial.

7. The apparatus of claim 4, wherein the terminal and the receiving end of the collapsible prosthesis delivery apparatus are configured to fold into a compact configuration for compact storage.

8. The apparatus of claim 4, wherein when the manually applicable directional pressure is not applied, a perimeter of the expandable opening is temporarily affixed together.

9. The apparatus of claim 1, wherein when the manually applicable directional pressure is applied to the receiving end, the at least one temporary adhesive releases to allow the at least one prosthesis to be inserted into the internal cavity.

10. A delivery system for inserting at least one prosthesis into a surgical pocket, the delivery system comprising:
the at least one prosthesis;
a collapsible prosthesis delivery apparatus, the collapsible prosthesis delivery apparatus comprising:
a terminal end and a receiving end, the collapsible prosthesis delivery apparatus having an initial delivery position, whereby the collapsible prosthesis is tapered such that a width of the terminal end is smaller than a width of the receiving end;
a waist region having a top and a bottom, the waist region being positioned between the terminal end and the receiving end of the collapsible prosthesis delivery apparatus, wherein the waist region defines a transition between a proximal region and a terminal region;
an expandable opening of the terminal end, wherein the expandable opening is configured to temporarily affix together when not in use and expand upon manually applicable pressure to facilitate extrusion of the prosthesis;
an interior surface that forms an internal cavity, the internal cavity being sized to receive at least one prosthesis; and
at least one channel circumferentially disposed about at least one portion of the internal cavity of the collapsible prosthesis delivery apparatus, the at least one channel being in fluidic communication with the internal cavity, whereby the at least one channel receives lubricant from a fluid lining and is structured to direct the lubricant across the entire interior surface of the internal cavity;
wherein the receiving end comprises a sealable opening, wherein the sealable opening includes at least one temporary adhesive configured to temporarily affix a circumference of the sealable opening together, and wherein the at least one temporary adhesive is configured to release the receiving end upon application of a manually applicable directional pressure;
wherein the collapsible prosthesis delivery apparatus is free-standing when the terminal end is disposed on a medical surface, whereby the collapsible prosthesis delivery apparatus remains stable for manual manipulation during a surgical procedure;
wherein the collapsible prosthesis delivery apparatus is adapted to be manually manipulated to translate the at least one prosthesis along the internal cavity and through the expandable opening; and
wherein subsequent to the at least one prosthesis being extruded from the expandable opening, the collapsible prosthesis delivery apparatus returns to the initial delivery position.

11. The system of claim 10, wherein the at least one channel further comprises a plurality of predefined ridges, the plurality of predefined ridges abutting at least one portion of the interior surface, whereby subsequent to receiving the at least one lubricant, the plurality of ridges funnel the at least one lubricant into the at least one channel, such that the interior surface of the internal cavity is evenly coated with the at least one lubricant.

12. The system of claim 11, wherein subsequent to the at least one prosthesis being disposed near the receiving end, the waist region inhibits the at least one prosthesis from translating toward the terminal end.

13. The system of claim 12, further comprising a fluid lining disposed about a portion of the receiving end, wherein the fluid lining is configured to retain a predetermined amount of at least one lubricant, whereby a manually applicable pressure causes the at least one lubricant to translate from the fluid lining through the at least one channel and be disposed about at least one portion of the internal cavity.

14. The system of claim 13, wherein the receiving end comprises a sealable opening, whereby during nonuse the sealable opening is closed, thereby preventing any portion of the at least one lubricant from escaping the fluid lining, the internal cavity, or both.

15. The system of claim 12, wherein the at least one lubricant is antibacterial.

16. A method of inserting at least one prosthesis into a surgical pocket, the method comprising:
- providing a collapsible prosthesis delivery apparatus, the collapsible prosthesis delivery apparatus comprising:
    - a terminal end and a receiving end, the collapsible prosthesis delivery apparatus having an initial delivery position, whereby the collapsible prosthesis is tapered such that a width of the terminal end is smaller than a width of the receiving end;
    - a waist region having a top and a bottom, the waist region being positioned between the terminal end and the receiving end of the collapsible prosthesis delivery apparatus, wherein the waist region defines a transition between a proximal region and a terminal region;
    - an expandable opening of the terminal end;
    - an interior surface that forms an internal cavity, the internal cavity being sized to receive at least one prosthesis;
    - at least one channel circumferentially disposed about at least one portion of the internal cavity of the collapsible prosthesis delivery apparatus, the at least one channel being in fluidic communication with the internal cavity; and
    - wherein the receiving end comprises a scalable opening, wherein the scalable opening includes at least one temporary adhesive configured to temporarily affix a circumference of the sealable opening together, and wherein the at least one temporary adhesive is configured to release the receiving end upon application of a manually applicable directional pressure;
    - wherein the collapsible prosthesis delivery apparatus is free-standing when the receiving end and the terminal end are disposed on a medical surface, whereby the collapsible prosthesis delivery apparatus remains stable for manual manipulation during a surgical procedure;
- disposing at least one lubricant, via the receiving end, into the at least one channel by manually expressing the lubricant from the fluid lining disposed about a portion of the receiving end;
- inserting the at least one prosthesis into the internal cavity of the collapsible prosthesis delivery apparatus, wherein the prosthesis delivery apparatus is free-standing when the terminal end is disposed on a medical surface during preparation and insertion of the at least one prosthesis;
- introducing the collapsible prosthesis delivery apparatus into the surgical pocket; and
- manipulating the collapsible prosthesis delivery apparatus to conform to a shape of the at least one prosthesis and apply pressure to translate the at least one prosthesis along the length of the internal cavity, out of the expandable opening, and into the surgical pocket, wherein subsequent to the at least one prosthesis being extruded from the expandable opening, the collapsible prosthesis delivery apparatus retracts to its initial delivery position.

* * * * *